(12) United States Patent
Bishel

(10) Patent No.: US 7,412,905 B1
(45) Date of Patent: Aug. 19, 2008

(54) PADDLE SENSOR

(76) Inventor: Richard Anthony Bishel, 16020 NW. Ridgetop La., Beaverton, OR (US) 97006

( * ) Notice: Subject to any disclaimer, the term of this patent is extended or adjusted under 35 U.S.C. 154(b) by 46 days.

(21) Appl. No.: 11/142,600

(22) Filed: May 31, 2005

Related U.S. Application Data

(60) Provisional application No. 60/576,069, filed on May 31, 2004.

(51) Int. Cl.
- *G01L 5/00* (2006.01)
- *A01D 69/08* (2006.01)
- *F16D 27/12* (2006.01)
- *H01H 35/00* (2006.01)

(52) U.S. Cl. ............ 73/862; 56/10.2 D; 56/10.2 E; 180/401; 200/61.21; 192/125 D

(58) Field of Classification Search ..... 73/54.28–54.35, 73/54.37; 192/53.2, 55.1, 55.2, 109 R, 125 D, 192/129 R, 138; 200/61.21; 56/10.2 D, 56/10.2 E; 180/401

See application file for complete search history.

(56) References Cited

U.S. PATENT DOCUMENTS

| | | | |
|---|---|---|---|
| 1,980,553 A | 11/1934 | Salisbury | |
| 2,851,553 A | 9/1958 | Grostick | |
| 2,981,355 A | 4/1961 | Rabuse | |
| 3,402,784 A | 9/1968 | Roberson et al. | |
| 3,425,197 A | 2/1969 | Kita | |
| 3,583,514 A | 6/1971 | Taylor | |
| 3,818,159 A * | 6/1974 | Evans et al. | 200/61.21 |
| 3,941,956 A | 3/1976 | Delin et al. | |
| 3,952,828 A | 4/1976 | Stampfer et al. | |
| 3,979,022 A | 9/1976 | Whited | |
| 4,077,488 A | 3/1978 | Bennett, Jr. et al. | |
| 4,095,064 A | 6/1978 | Fleckenstein | |
| 4,133,404 A | 1/1979 | Griffin | |
| 4,136,508 A | 1/1979 | Coleman et al. | |
| 4,147,906 A | 4/1979 | Levine | |
| 4,157,036 A | 6/1979 | Kivenson | |
| 4,184,559 A | 1/1980 | Rass | |
| 4,211,966 A | 7/1980 | Sweet | |
| 4,318,624 A | 3/1982 | Jett | |
| 4,375,020 A | 2/1983 | Holterbosch | |
| 4,392,032 A | 7/1983 | Roach | |
| 4,444,001 A | 4/1984 | Thurnau et al. | |
| 4,507,910 A | 4/1985 | Thornley et al. | |
| 4,551,663 A | 11/1985 | Gruber | |

(Continued)

OTHER PUBLICATIONS ("Paddle". (1993). Webster's Third New International Dictionary, Unabridged. Retrieved Dec. 10, 2007, from http://lionreference.chadwyck.com/).*

(Continued)

*Primary Examiner*—Edward Lefkowitz
*Assistant Examiner*—Punam Patel

(57) ABSTRACT

A rotary paddle sensor for detecting a substance. A paddle or paddles are mounted on a rotating shaft coupled to a motion of the shaft by a slip clutch mechanism. The sensor detects movement of the paddle. If a substance impedes the movement of the paddle, the sensor detects this occurrence. The sensor can be used for many different applications, such as to detect the level of material in a bin, to determine the distance to a wall, to determine the height from the ground, to detect the boundary between two surfaces such as mowed or unmowed vegetation, or to detect the vegetation in a row.

15 Claims, 22 Drawing Sheets

U.S. PATENT DOCUMENTS

| | | | |
|---|---|---|---|
| 4,603,753 A | 8/1986 | Yoshimura et al. | |
| 4,695,685 A | 9/1987 | Fleckenstein et al. | |
| 4,726,175 A | 2/1988 | Day, V et al. | |
| 4,777,785 A | 10/1988 | Rafaels | |
| 4,827,768 A | 5/1989 | Tuckey | |
| 4,883,964 A | 11/1989 | Bohman | |
| 4,884,444 A | 12/1989 | Tuckey | |
| 5,010,719 A | 4/1991 | Korthuis | |
| 5,127,214 A * | 7/1992 | Colistro | 56/6 |
| 5,155,984 A | 10/1992 | Sheehan | |
| 5,164,555 A | 11/1992 | Brenton | |
| 5,410,479 A | 4/1995 | Coker | |
| 5,471,825 A | 12/1995 | Panoushek et al. | |
| 5,503,003 A * | 4/1996 | Brookfield | 73/54.32 |
| 5,528,888 A | 6/1996 | Miyamoto et al. | |
| 5,694,751 A | 12/1997 | Behnke | |
| 5,715,666 A | 2/1998 | Huster et al. | |
| 5,794,421 A | 8/1998 | Maichle | |
| 5,911,669 A | 6/1999 | Stentz et al. | |
| 6,041,583 A | 3/2000 | Goering et al. | |
| 6,088,644 A | 7/2000 | Brandt et al. | |
| 6,095,254 A | 8/2000 | Homburg | |
| 6,101,795 A | 8/2000 | Diekhans | |
| 6,202,395 B1 | 3/2001 | Gramm | |
| 6,211,794 B1 | 4/2001 | DeSoto | |
| 6,236,916 B1 | 5/2001 | Staub et al. | |
| 6,289,659 B1 | 9/2001 | Fox | |
| 6,385,515 B1 | 5/2002 | Dickson et al. | |
| 6,389,785 B1 | 5/2002 | Diekhans et al. | |
| 6,397,569 B1 | 6/2002 | Homburg et al. | |
| 6,418,805 B1 | 7/2002 | Carney et al. | |
| 6,523,333 B2 | 2/2003 | Metzger | |
| 6,588,187 B2 | 7/2003 | Engelstad et al. | |
| 6,600,882 B1 | 7/2003 | Applegate et al. | |
| 6,615,570 B2 | 9/2003 | Beck et al. | |
| 6,690,160 B2 | 2/2004 | Gray et al. | |
| 6,696,965 B2 | 2/2004 | Stout et al. | |
| 6,760,654 B2 | 7/2004 | Beck | |
| 6,784,808 B2 | 8/2004 | Hoetzel et al. | |
| 6,826,894 B2 | 12/2004 | Thiemann et al. | |
| 6,832,469 B2 | 12/2004 | Scott et al. | |
| 2003/0196294 A1 * | 10/2003 | Conrad | 15/331 |
| 2005/0007057 A1 | 1/2005 | Peless et al. | |

OTHER PUBLICATIONS ("Level". (1992). Academic Press Dictionary of Science and Technology. Retrieved Dec. 10, 2007, from http://www.xreferplus.com/entry/3123263).*

* cited by examiner

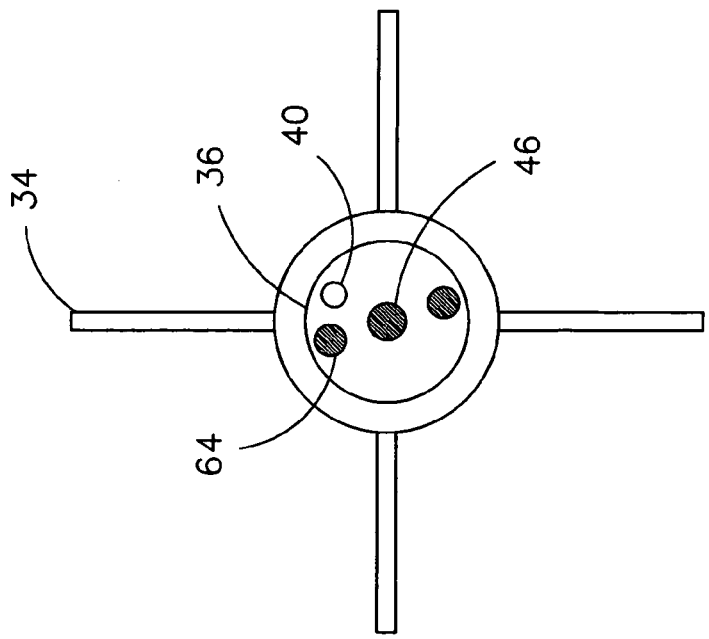
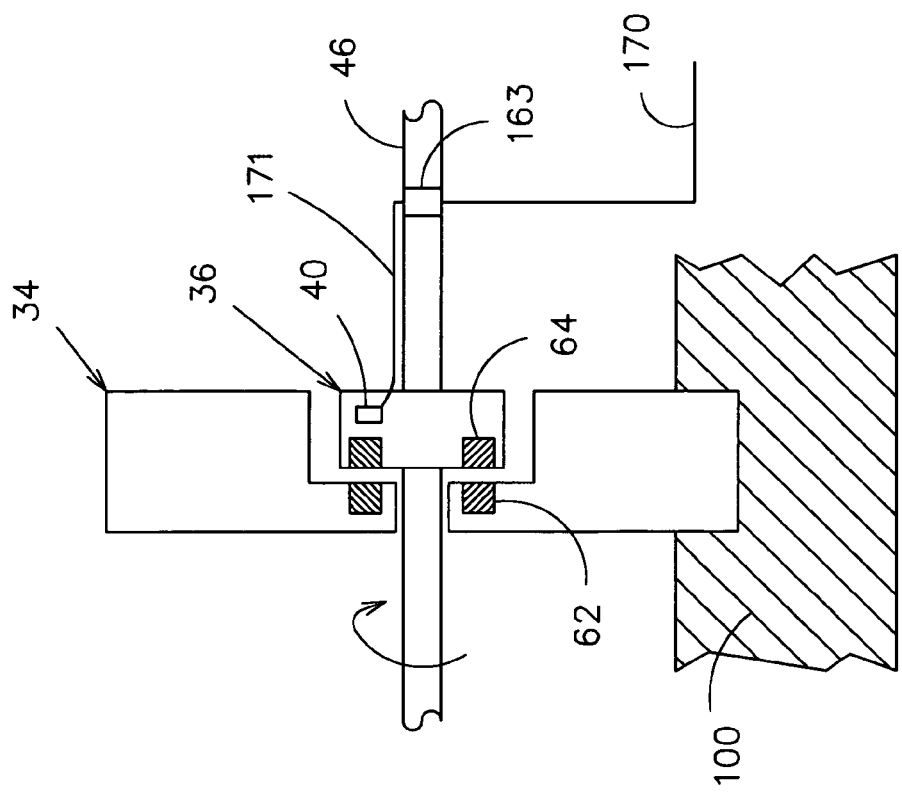
FIG. 1B
FIG. 1A

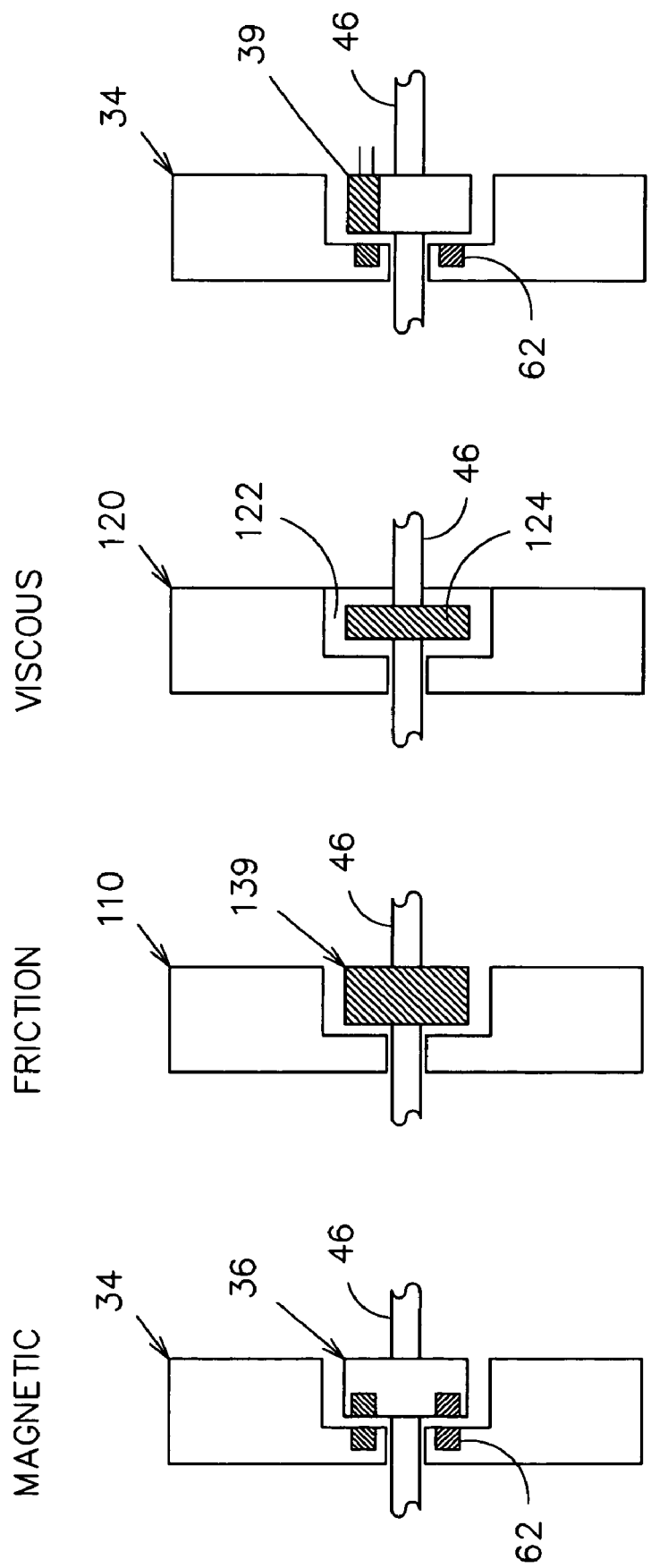

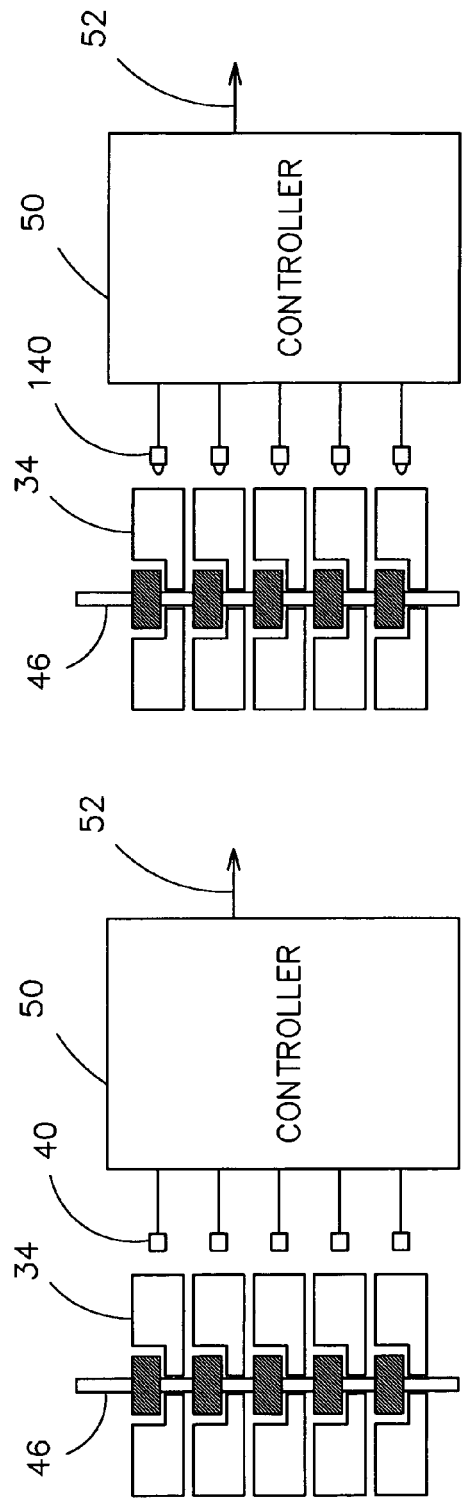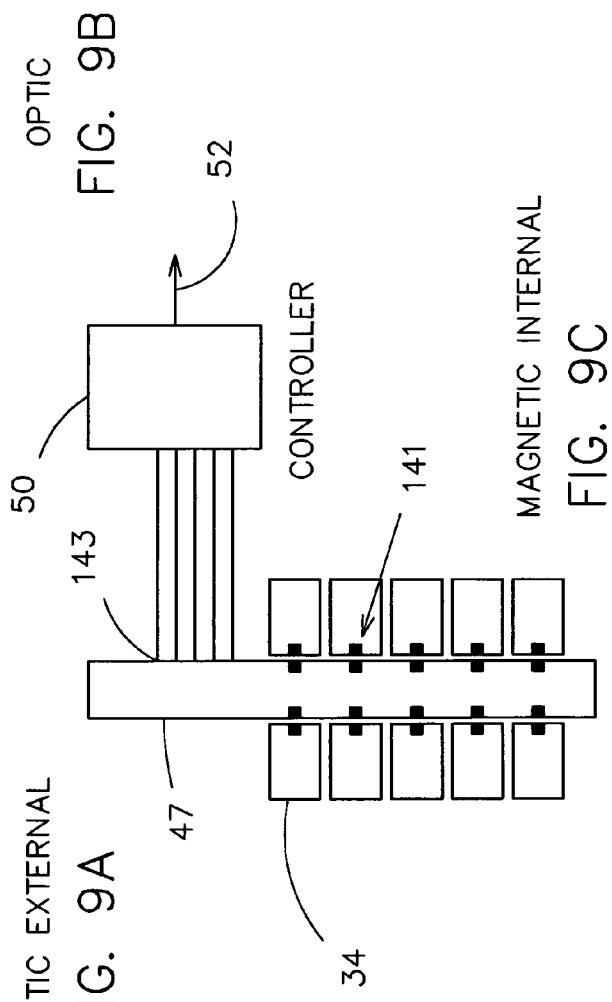
FIG. 9A  MAGNETIC EXTERNAL
FIG. 9B  OPTIC
FIG. 9C  MAGNETIC INTERNAL

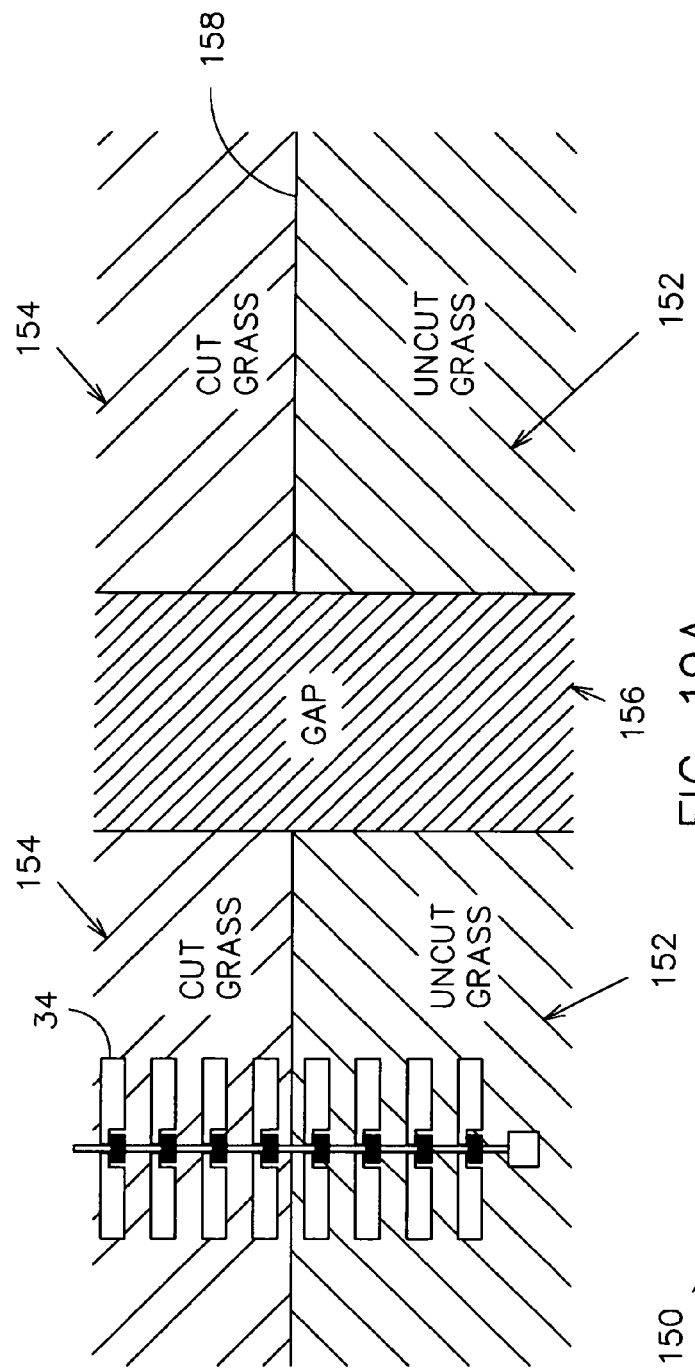
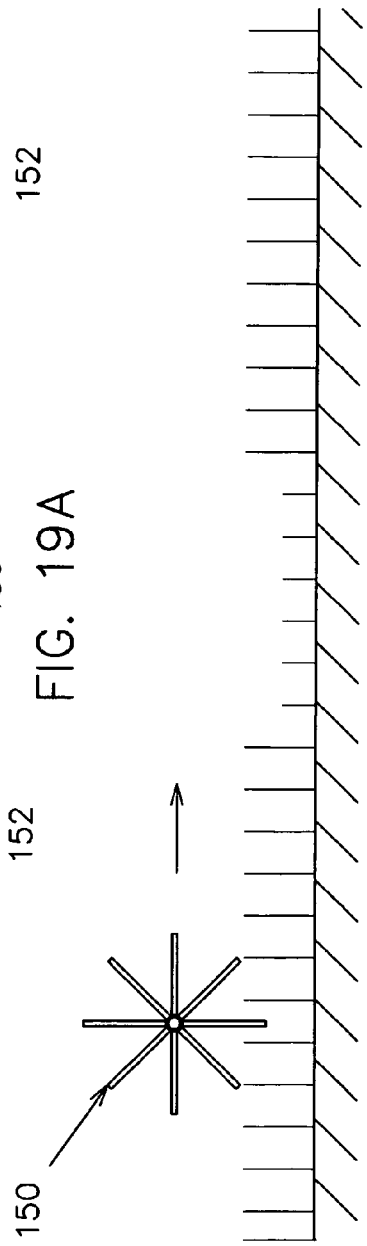
FIG. 19A
FIG. 19B

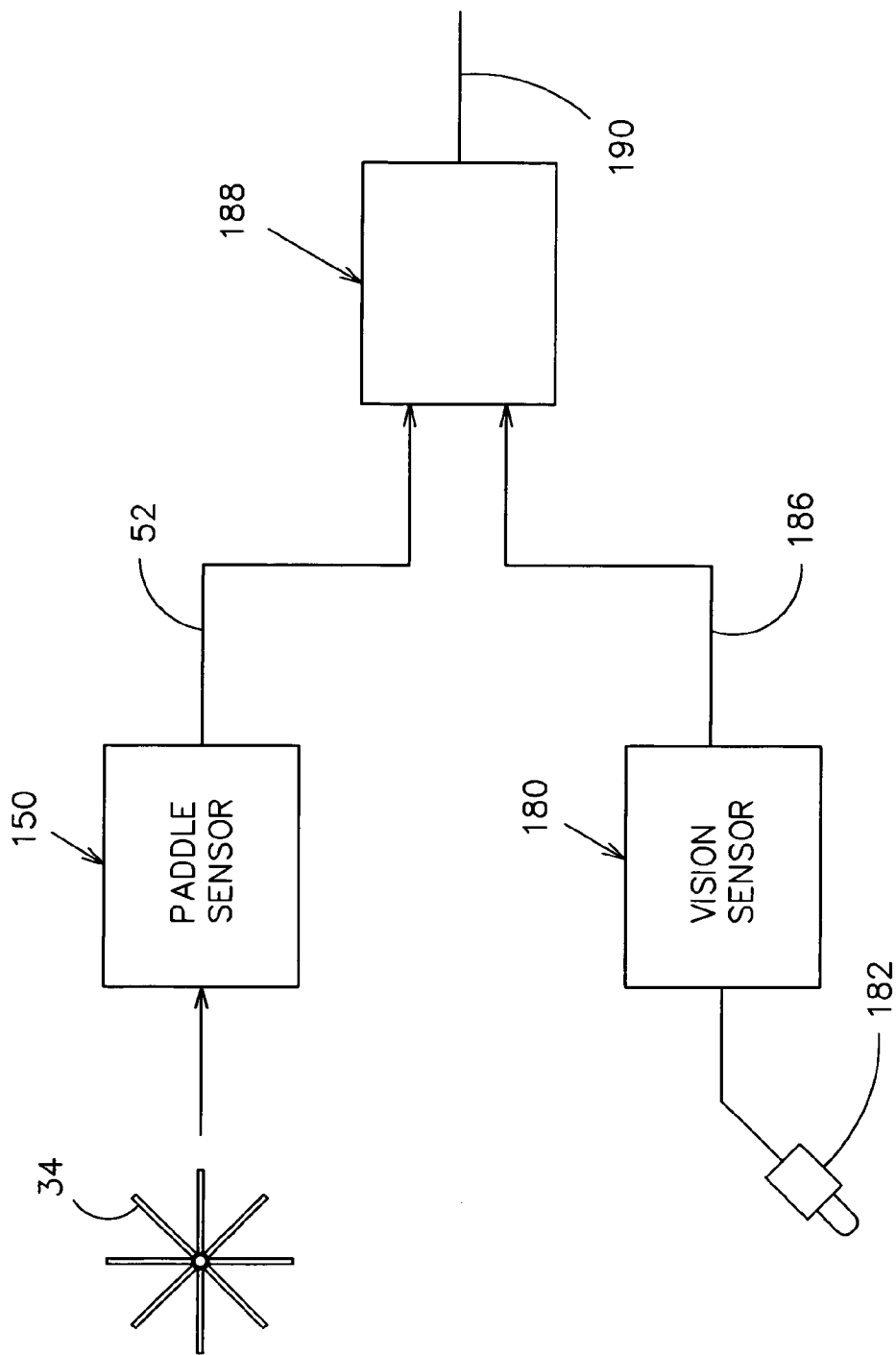

PADDLE SENSOR

RELATED APPLICATIONS

This application claims the benefit of Provisional Patent Application No. 60/576,069 filed on May 31, 2004.

FIELD OF INVENTION

The present invention relates to sensors for detecting the proximity of material by physical contact, and more particularly, to a sensor for determining a level, distance, boundary, or height of a material by contacting the material with a rotating paddle.

BACKGROUND OF THE INVENTION

Rotary paddle sensors are currently used to monitor the level of dry bulk materials in storage bins, grain hoppers, silos, and other structures. A bin level indicator usually consists of a small electric motor mounted in a housing, attached to a paddle with one or more vanes that drives the paddle. The paddle is able to freely rotate in absence of material. But when the paddle is impeded by material, the motor rotates within a housing which triggers a mechanical switch. The switch turns off the motor and also gives an indication that the material has reached the level of the paddle. U.S. Pat. Nos. 2,851,553, 3,941,956, and 4,095,064 describe such mechanism which responds to stalling of the motor due to the level of the bulk material.

U.S. Pat. No. 4,211,966 describes an improvement using a spring coupling which provides a time delay feature, but the invention still utilizes the stalling of the motor. U.S. Pat. No. 4,318,624 describes a slip clutch mechanism between the paddle and the motor, but still relies on movement of the motor to engage a mechanical switch. The slip clutch prevents possible damage to the electric motor due to the stoppage of the paddle if the switches do not turn off the motor.

U.S. Pat. Nos. 4,827,768 and 4,884,444 show multiple paddles on a driven shaft to indicate a level of a fluid, but the paddles are fixed to the driven shaft and the level is determined by the torque needed to overcome the fluid resistance. The invention would not work with dry bulk material such as grain or with other solid matter.

U.S. Pat. No. 4,375,020 describes a friction clutch that isolates the motor from the paddle, but the invention also relies on the rotation of the motor to engage a mechanical switch. U.S. Pat. No. 6,696,965 employs the same technique as in the previously described designs, but instead of using mechanical switches U.S. Pat. No. 6,696,965 uses a magnetic pickup to indicate the movement of the motor.

The past rotary paddle sensors have several drawbacks. They rely on the movement of the electric motor to engage mechanical contact switches which are prone to wear out and fail, causing the electric motor to overheat. The movement of the electric motor within housing requires intricate mechanical design and is also prone to wearing out. The bin level rotary paddle designs are limited to indicate one specific level since the design relies on a close coupling between a single motor and the paddle. In the multiple paddle designs, the designs are limited to determining only fluid level.

There is consequently a need for a form of rotary paddle sensor that eliminates reliance on movement of the electric motor itself which would simplify the mechanical design and allow for use of other driving mechanisms. There is also a need to eliminate any possible overheating of the motor and failure of the mechanical switches. Moreover, it would be desirable for such a sensor to have the ability to indicate more than one specific level.

SUMMARY OF INVENTION

It is therefore a general object of the invention to overcome the disadvantages of the prior art form of rotary paddle sensors.

One object of the invention is an apparatus for detecting a substance such as dry bulk materials with a rotating paddle coupled to a drive shaft by a slip clutch mechanism, and a sensor detecting the movement of the paddle. If the substance impedes the rotation of the paddle with respect to the driven shaft, the sensor would detect such movement.

In addition to detecting a substance, another of object of this invention is for detecting a boundary between two surfaces such as mowed or unmowed vegetation by using a plurality of paddles on a driven shaft. Each paddle is coupled to the shaft's motion by a slip clutch mechanism. The sensor detects the paddles impeded by the drag caused by passing over a first surface, such as unmowed vegetation, versus the paddles that are not impeded due to passing over a second surface, such as mowed vegetation.

Another object of this invention is to determine the distance from a solid or flowable material by using different length paddles. The longer length paddles would be impeded by the material prior to shorter length paddles. By having pre-determined length paddles, a sensor can detect the paddles that are not impeded by the material and output a distance to the material.

Another object of this invention is to measure the level for a flowable material by detecting the paddle or paddles on a vertical shaft impeded by the drag caused by the flowable material.

BRIEF DESCRIPTION OF DRAWINGS

FIG. 1A is a front view of the present invention with an obstruction and the hall-effect sensor mounted on the hub;

FIG. 1B is a side view of the present invention showing the location of the magnets and hall-effect sensor;

FIG. 8A is a front breakout view illustrating a magnetic slip clutch mechanism;

FIG. 8B is a front breakout view illustrating a friction slip clutch mechanism;

FIG. 8C is a front breakout view illustrating a viscous slip clutch mechanism;

FIG. 8D is a front breakout view illustrating a electromagnetic slip clutch mechanism;

FIG. 9A is a pictorial view illustrating the magnetic pickup sensors arrangement;

FIG. 9B is a pictorial view illustrating the optical pickup sensors arrangement;

FIG. 9C is a pictorial view illustrating the magnetic pickup sensor arrangement mounted on the shaft;

FIG. 19A is a top pictorial view of an embodiment detecting a boundary between mowed and unmowed vegetation where there is a gap in the vegetation;

FIG. 19B is a side pictorial view of an embodiment detecting a boundary between mowed and unmowed vegetation where there is a gap in the vegetation;

FIG. 20 is a block diagram of the embodiment integrated with a vision sensor;

DESCRIPTION OF INVENTION

Figure 2:
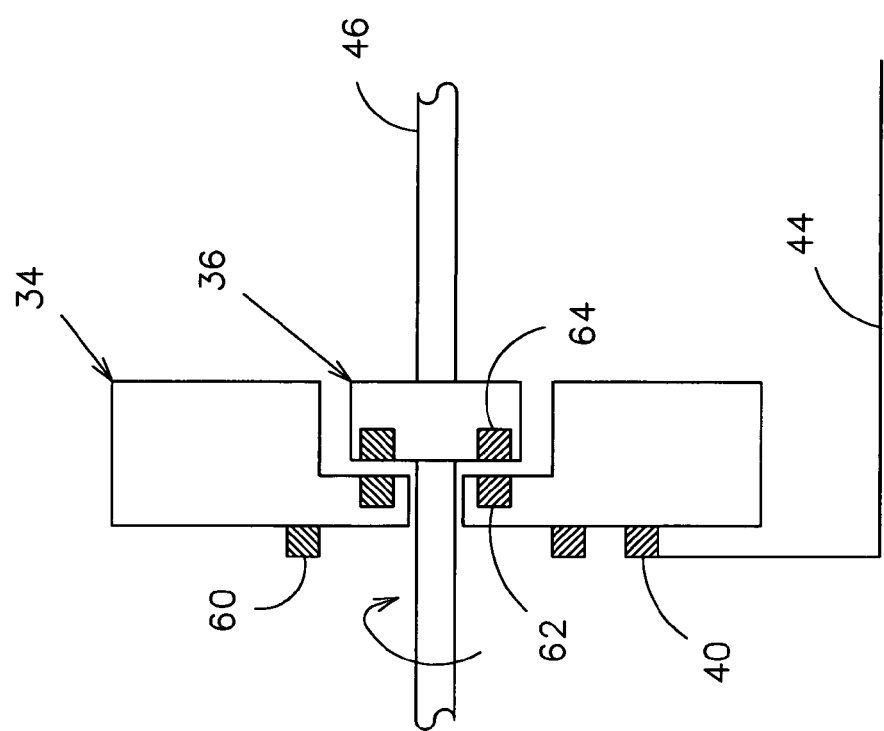
FIG. 2 is a front view of the present invention showing the hall-effect sensor mounted off the hub.

FIG. 1A shows a diagram of the preferred embodiment of the invention. A paddle 34 is installed on a rotating shaft 46 and coupled to the shaft's motion by a hub 36 which is physically connected to the rotating shaft 46. The coupling mechanism between the hub 36 and the paddle 34 is a magnetic attractive force between the permanent magnets 64 and the magnetic material 62 placed on the paddle 34. As the shaft 46 rotates, the paddle 34 rotates with the shaft 46 because of the magnetic coupling force. A hall-effect sensor 40 is mounted on the hub 36 that rotates with the shaft 46. In this configuration, the sensor 40 rotates with the shaft 46 and detects the relative motion between the paddle 34 and the shaft 46. The sensor output 170 which comes from the sensor 40, via wires 171 through the slip ring 163, gives relative motion and is zero when the shaft 46 and the paddle 34 are moving together. When a substance 100 is placed in the path of the rotating paddle 34, the magnetic force coupling the hub 36 to the paddle 34 is not sufficient to overcome the drag on the paddle 34 caused by the substance 100. The paddle 34 does not rotate relative to the shaft 46. Since the hub 36 is still rotating, the sensor 40 detects the rotation of the hub 36 with respect to the paddle 34 and outputs on line 170 a signal every time the sensor 40 passes by the magnetic material 62. The preferred embodiment therefore can detect substances impeding the movement of the paddle 34 by output a signal on line 170. If no substance is impeding the paddle 34, there would be no signal on line 170.

FIG. 1B shows the side view of the preferred embodiment. In this view, the sensor 40 is shows on one side of the hub 36 and the permanent magnets 64 are show on the opposite sides of each other. The resolution of the signal can be varied by changing the shaft speed or the number of magnetic materials 62.

In another embodiment, shown FIG. 2, the sensor 40 is not attached to the rotating shaft 46, but mounted stationary parallel to the rotating paddle 34. In this embodiment the metallic or magnetic material 60 is attached to the paddle 34 so that when the paddle 34 rotates, the sensor 40 detects the movement of the paddle 34 rotating with the shaft 46. The paddle 34 may be made of metallic material and the added material 60 not needed. The magnets 64 and magnetic material 62 attract each other and hold the hub 36 which is attached to the shaft 46 to the paddle 34. As the shaft 46 rotates, the hub 36 and paddle 34 rotate with the shaft as long as there is no resistance to motion of the paddle 34. If resistance to the paddle motion is encountered, the shaft 46 continues to rotate, but the paddle 34 does not or rotates at a slower rate. Sensor 40 detects the motion of the paddle by magnetic means and indicates whether the paddle is moving or not moving. In this embodiment, the output 44 of the sensor 40 provides a signal when the paddle 34 is moving and no signal when the paddle is impeded by a substance.

Figure 3:
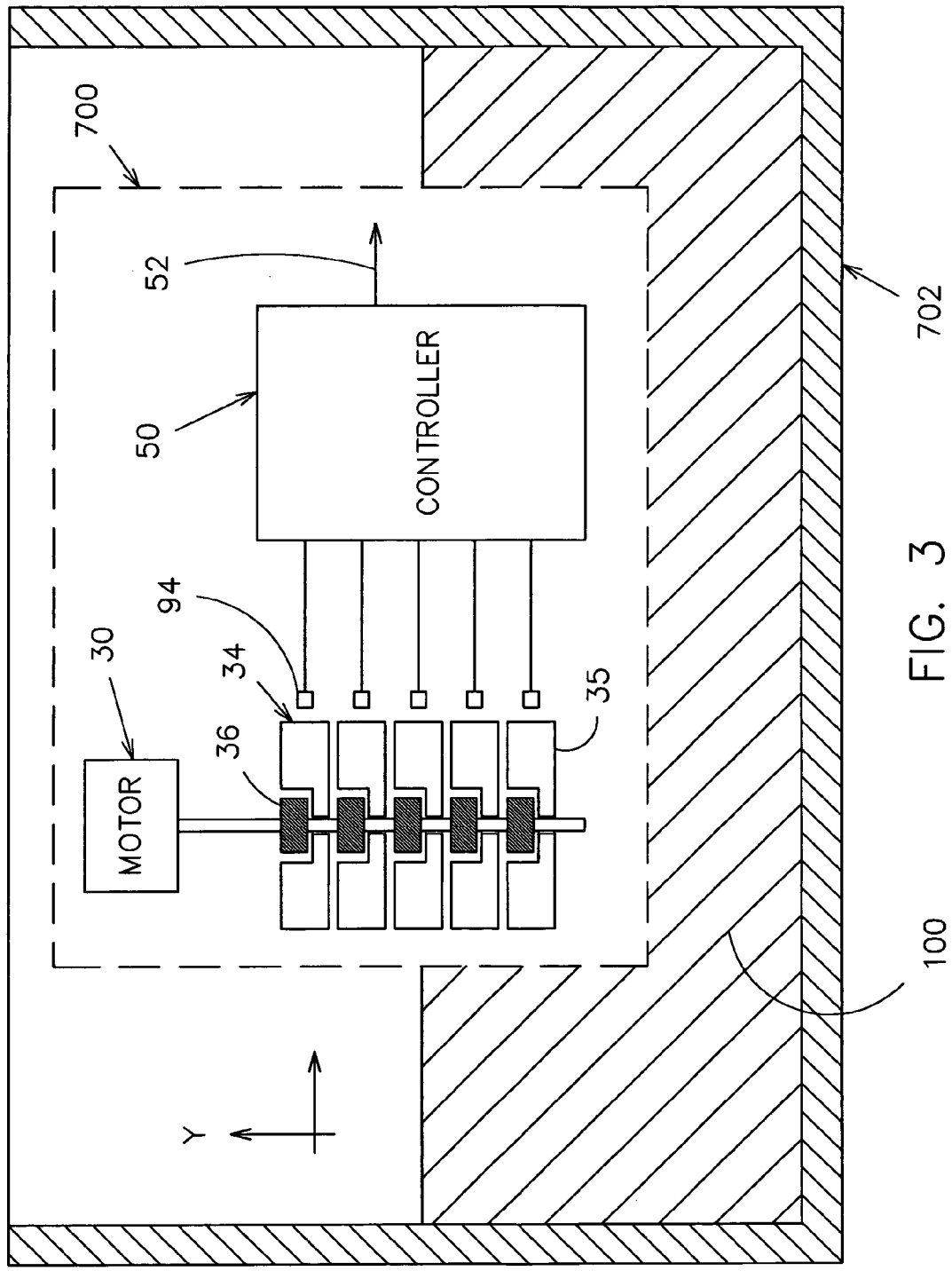
FIG. 3 is a front pictorial view of an embodiment with multiple paddles use in a bin to measure the level of bulk material such as grain.

Another embodiment 700 of the invention shown in FIG. 3 indicates the level of bulk material 100 such as grain or oil in a container 702. The vertically mounted paddle sensor 700 detects the level of material 100 by the number of rotating paddles 34 that are not impeded by the material 100. In this embodiment, the motor 30 drives the shaft 46 and the hubs 36 at a predetermined speed. The hubs 36 are coupled to the paddles 34 by a magnetic clutch as shown in FIG. 2. The paddles 34 rotating motion is detected by sensors 94 and sent to a controller 50. The controller 50 processes the information from the sensors 94 compares it with the stored pre-determined speed and indicates which paddles are not moving. The output a signal on line 52 indicates the level of the material 100 in the container 702.

Figure 4:
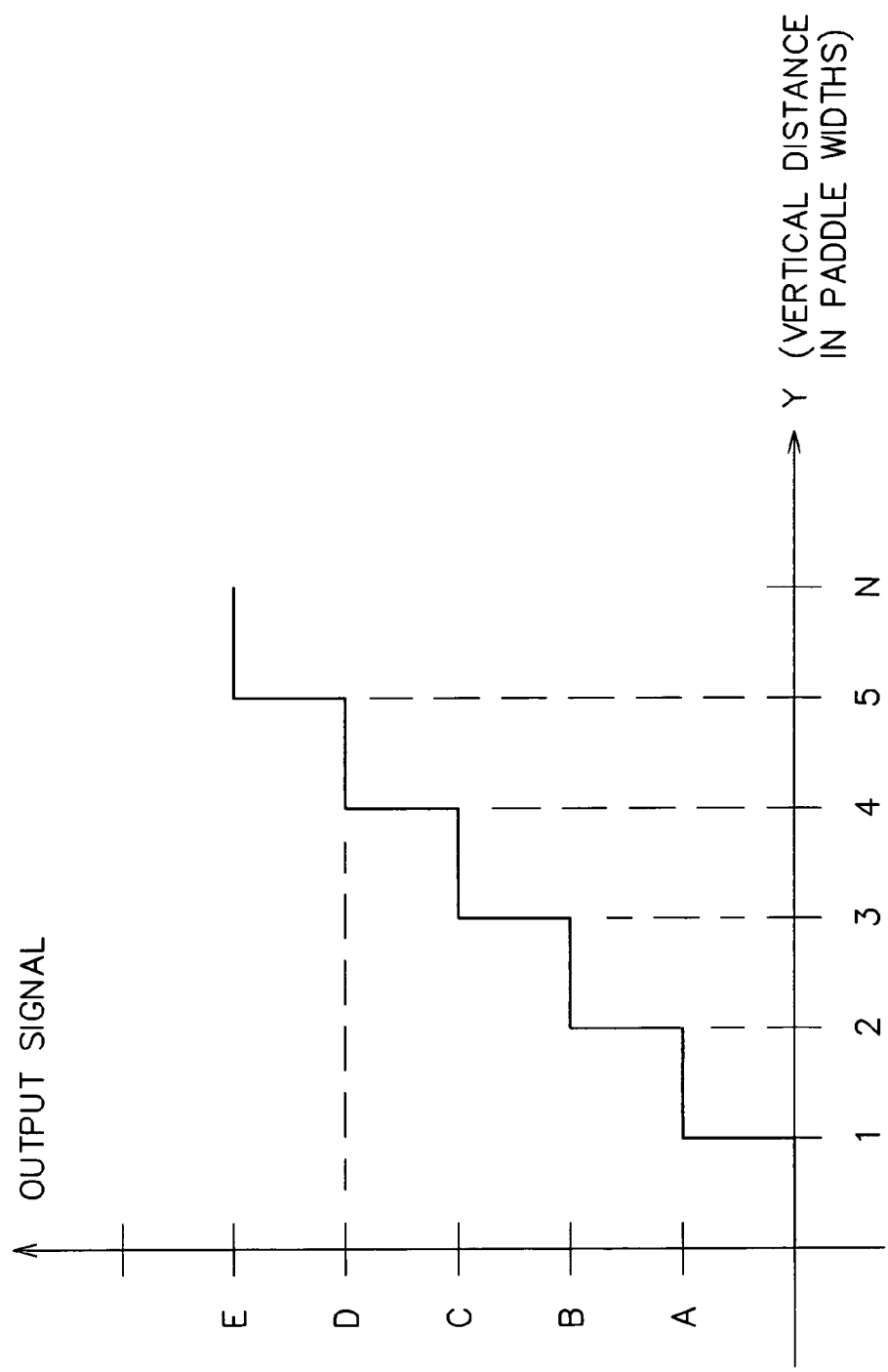
FIG. 4 is a graphical plot of the output of the embodiment in FIG. 3 respect to the number of paddles in the material.

FIG. 4 illustrates the output signal on line 52 from the controller 50 shown in FIG. 3. If all the paddles are rotating, the signal would be zero, indicating the material 100 has not reached the lowest paddle 35. If lowest paddle 35 is not moving, the output signal would be at level 'A'. If two paddles are not moving, the output signal 52 would be at level 'B'. If all paddles are not moving, the output would be at level 'E' indicating that the material has reached the highest level. The output signal 52 depends on the total number of paddles 34, the width and spacing of paddles 34, and the number of paddles in the material 100.

Figure 5B:
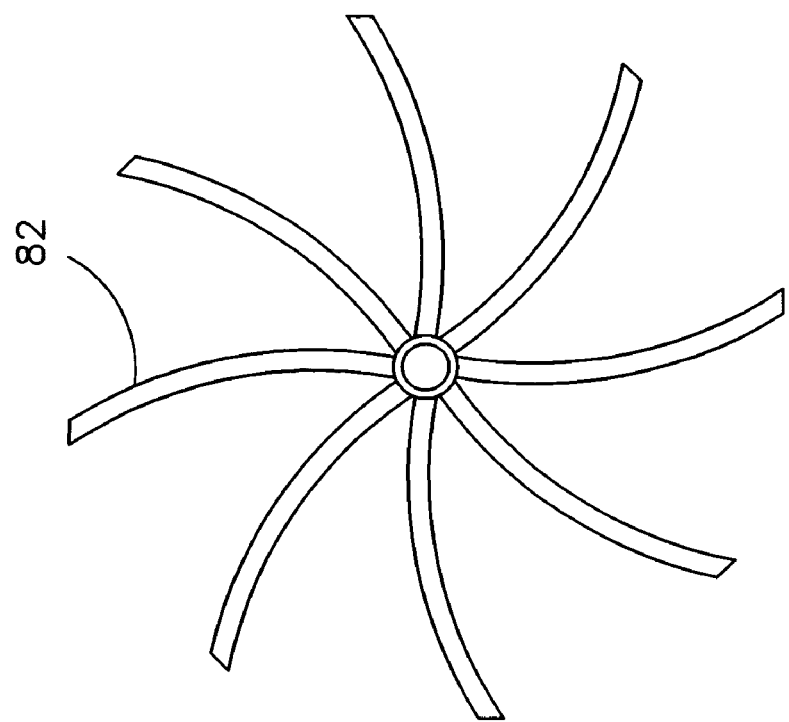
FIG. 5B is a side view of a flexible paddle.
Figure 5A:
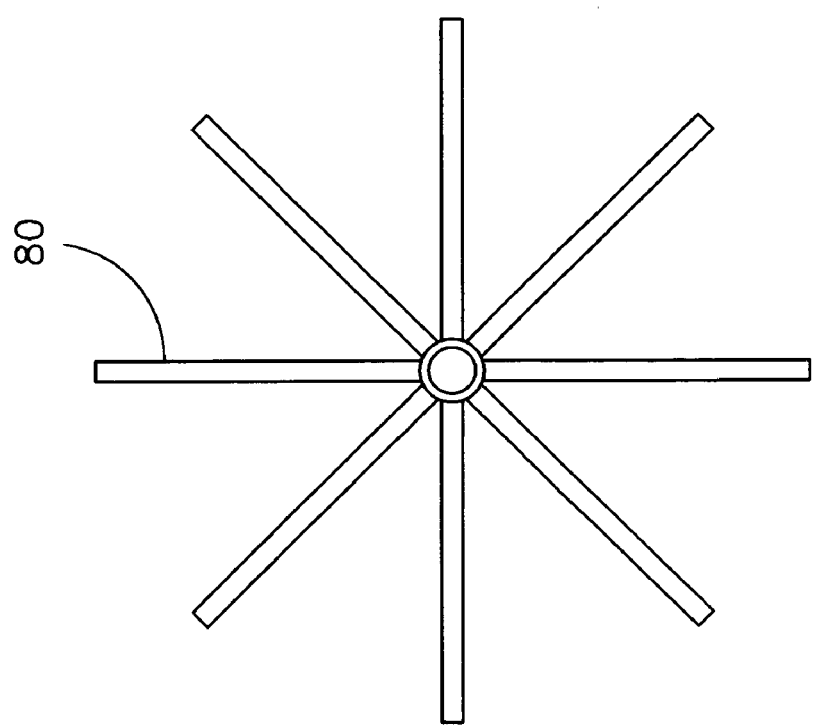
FIG. 5A is a side view of a rigid paddle.

FIGS. 5A and 5B show variations of the design of the paddles. FIG. 5A shows a rigid paddle 80 whereas FIG. 5B shows a flexible paddle 82. Applications for a rigid paddle 80 would be in flowable material such as grain, oil, etc. Applications for a flexible paddle 82 would be to detect rigid substances such as a sidewalk curb, unmowed vegetation, ground, etc. In addition, the paddle may be formed of sturdy or flexible wires, rods, spokes, etc.

Figure 6B:
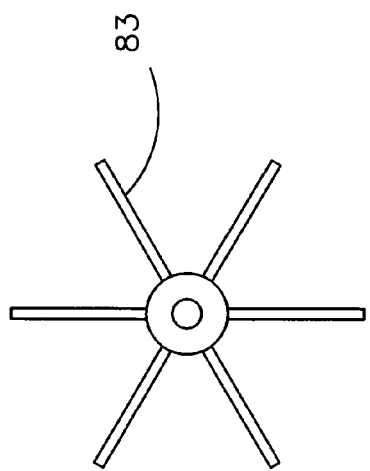
FIG. 6B is a side view of a wide paddle.
Figure 7B:
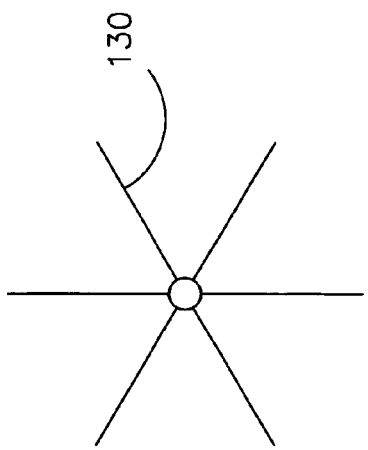
FIG. 7B is a side view of a narrow paddle or rigid wires.
Figure 6A:
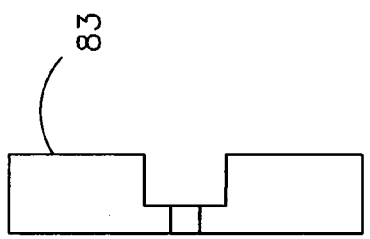
FIG. 6A is a front view of a wide paddle.
Figure 7A:
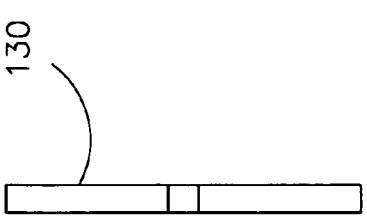
FIG. 7A is a front view of a narrow paddle or rigid wires.

FIGS. 6A and 6B show two views of wide paddle 83. FIGS. 7A and 7B show two views of a very narrow paddle 130. Different paddle widths allow different surfaces to be detected; also, the width and spacing of the paddle are two factors determining the resolution of the output.

All types of paddles can be used in the paddle sensor. Different widths of the paddle can also be used in the same paddle sensor for a nonlinear output of the sensor. There may be only one paddle or multiple paddles on the same paddle wheel. Different lengths of the paddle can be used on the multiple paddle wheels.

FIGS. 8A, 8B, 8C, and 8D show several different methods of coupling the shaft 46 to the paddle 34. The coupling mechanism is a slip clutch device that holds the rotating items together until the torque or rotational force between the two items exceeds a set value. The set value can be pre-determined, variable, or programmable. The coupling depends on the application and its needs to be firm enough to allow the paddle 34 to rotate with the hub 36 which is attached to the shaft 46 when no obstruction to the paddle 34 exists. However, if the paddle 34 is prevented from movement or less movement, the coupling would allow the hub 36 to move freely with the shaft 46 even though the paddle 34 is not. FIG. 8A shows the magnetically coupled hub 36 with the paddle 34. FIG. 8B shows a friction coupled hub 139 to the paddle 110. FIG. 8C shows a vicious coupled hub 124 to the paddle 120 by a fluid 122. FIG. 8D shows an electromagnetic coupling mechanism where the attractive forces between an electromagnetic coil 39 and the magnetic material 62 can be vary by the electric current driven into the electromagnetic coil 39. The coupling forces can be easily be altered via the electric current for different applications. Also, the electromagnetic coil 39 can have a dual use and be used as a sensor to detect relative movement between the shaft 46 and the paddle 34 in addition being part of the slip clutch mechanism. Other slip clutch mechanisms such pneumatic, hydraulic, etc. can be employed to allow the paddle 34 to move with the shaft 46 when no obstruction to the paddle 34, but if obstruction, the paddle 34 would not move with the shaft 46.

FIGS. 9A, 9B, and 9C show different sensors for detecting the rotating motion of the paddles. In FIG. 9A, magnetic sensors 40 detect the rotation of paddles 34. In FIG. 9B, optical sensors 140 detect the paddles' rotation. In FIG. 9C, magnetic sensors 141 detect the paddles' rotation, but the magnetic sensors 141 are installed into a hollow shaft 47 and uses slip rings 143 to provide an output. Other schemes to detect a rotating shaft can be used in addition to the ones mentioned, such as capacitive sensor or inductive sensor, for example.

Figure 10:
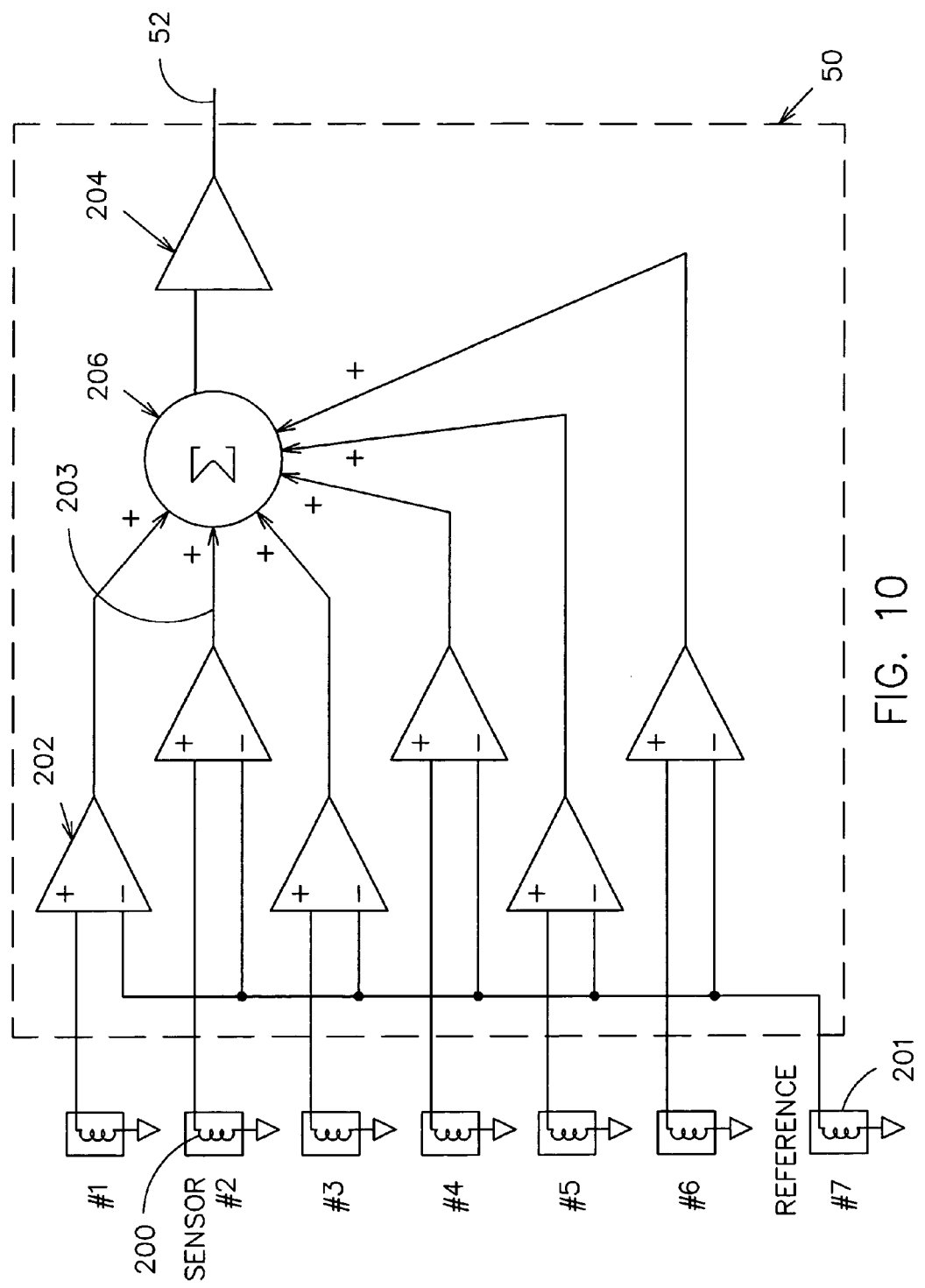
FIG. 10 is a block diagram of the controller scheme using hall-effect pickup sensors and analog circuitry.

In the module design 50, FIG. 10 shows implementation using standard logic circuitry. Comparators 202 compare the information from the sensor 200 with the information from the reference sensor 201 or pre-determined speed. If the outputs of the two sensors rotate at similar speeds, the output 203 from the comparator 202 would be low. If they are at different, the output after proper filtering would be high. Summing these output values in an adder circuit 206 with weighted values would give an output 52 that shows the number of paddles 40 in the obstruction.

Figure 11:
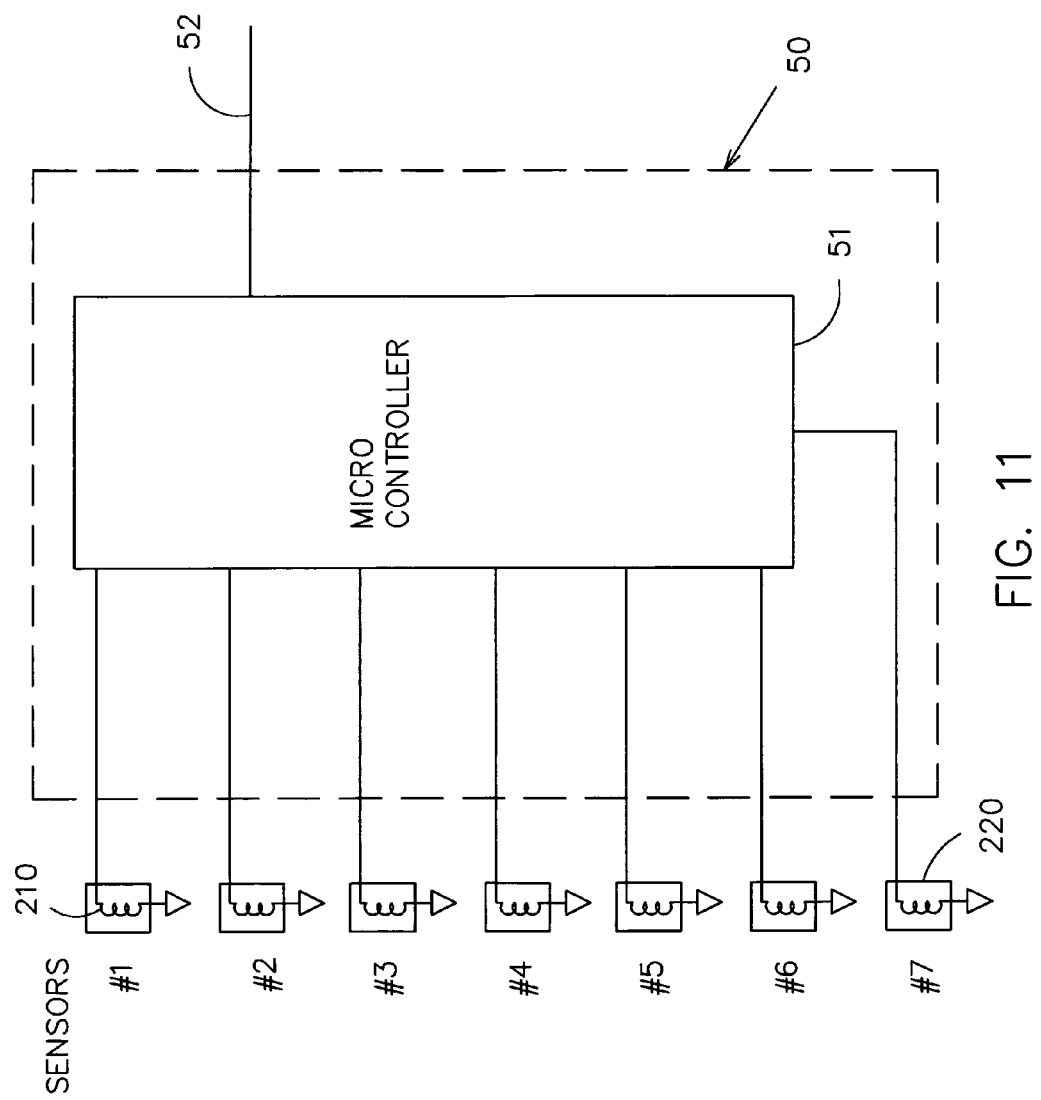
FIG. 11 is a block diagram of the controller scheme using hall-effect pickup sensors and a microcontroller.

FIG. 11 shows use of a microcomputer 51 instead of the logic circuitry of FIG. 10. The microcomputer 51 would be programmed to accomplish the logic circuitry design. The reference sensor 220 is not needed if the magnetic sensors 210 detect relative motion instead of actual rotating motion or pre-determined shaft speed is used.

Figure 12:
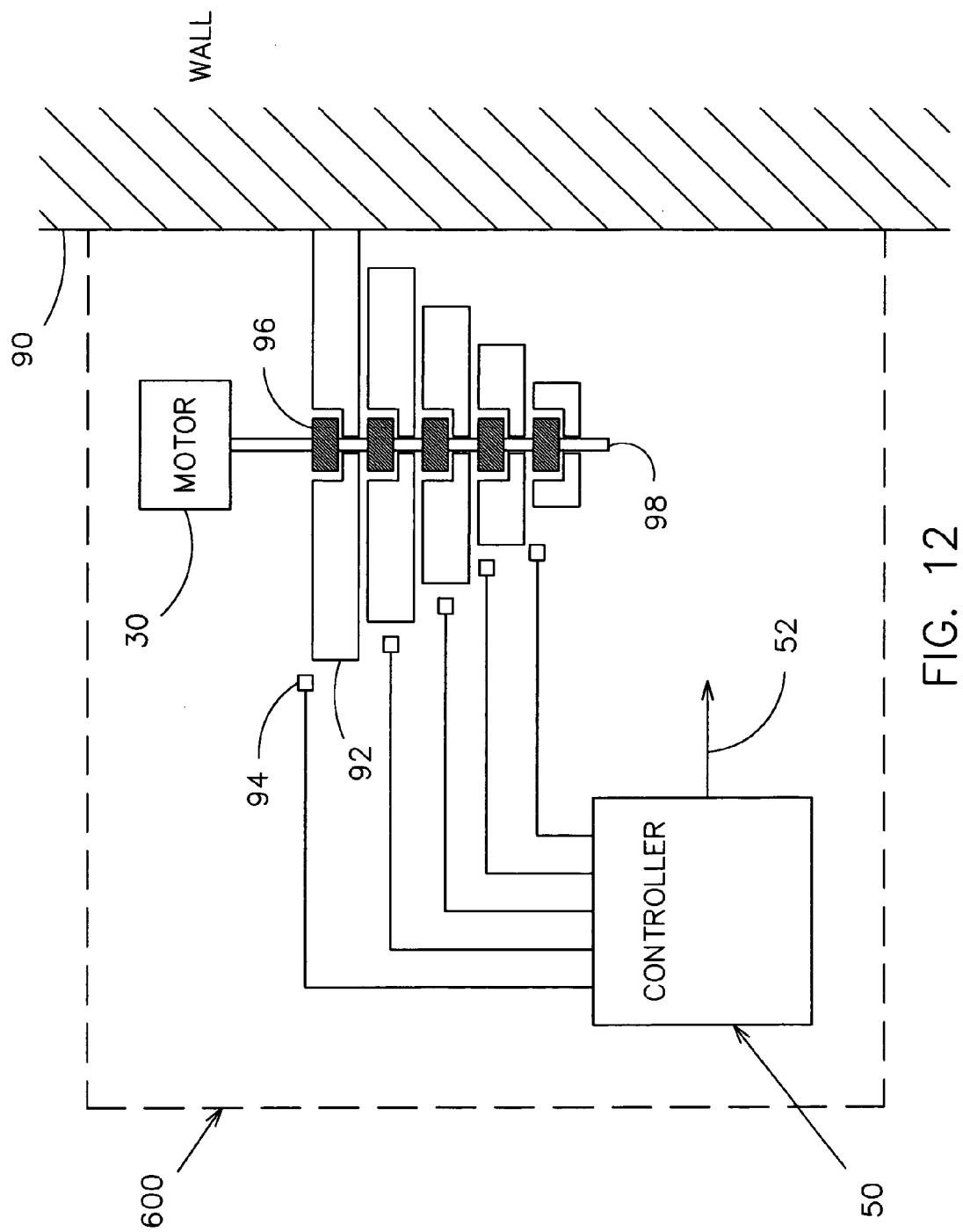
FIG. 12 is a front pictorial view of an embodiment detecting the distance to the wall.

In another embodiment, the paddle sensor 600 is designed to detect the distance from a wall structure. FIG. 12 shows such an arrangement. Here, the motor 30, paddles 92, sensors 94, and hubs 96 are mounted vertically and parallel to the wall surfaces 90. The paddles 92 have varying lengths, from the long ones to short ones. The module 50 would detect the number of paddles 92 via sensors 94 that are moving at the same rate as the shaft 98. By processing this information, the module 50 outputs on line 52 the distance from the wall 90.

Figure 13:
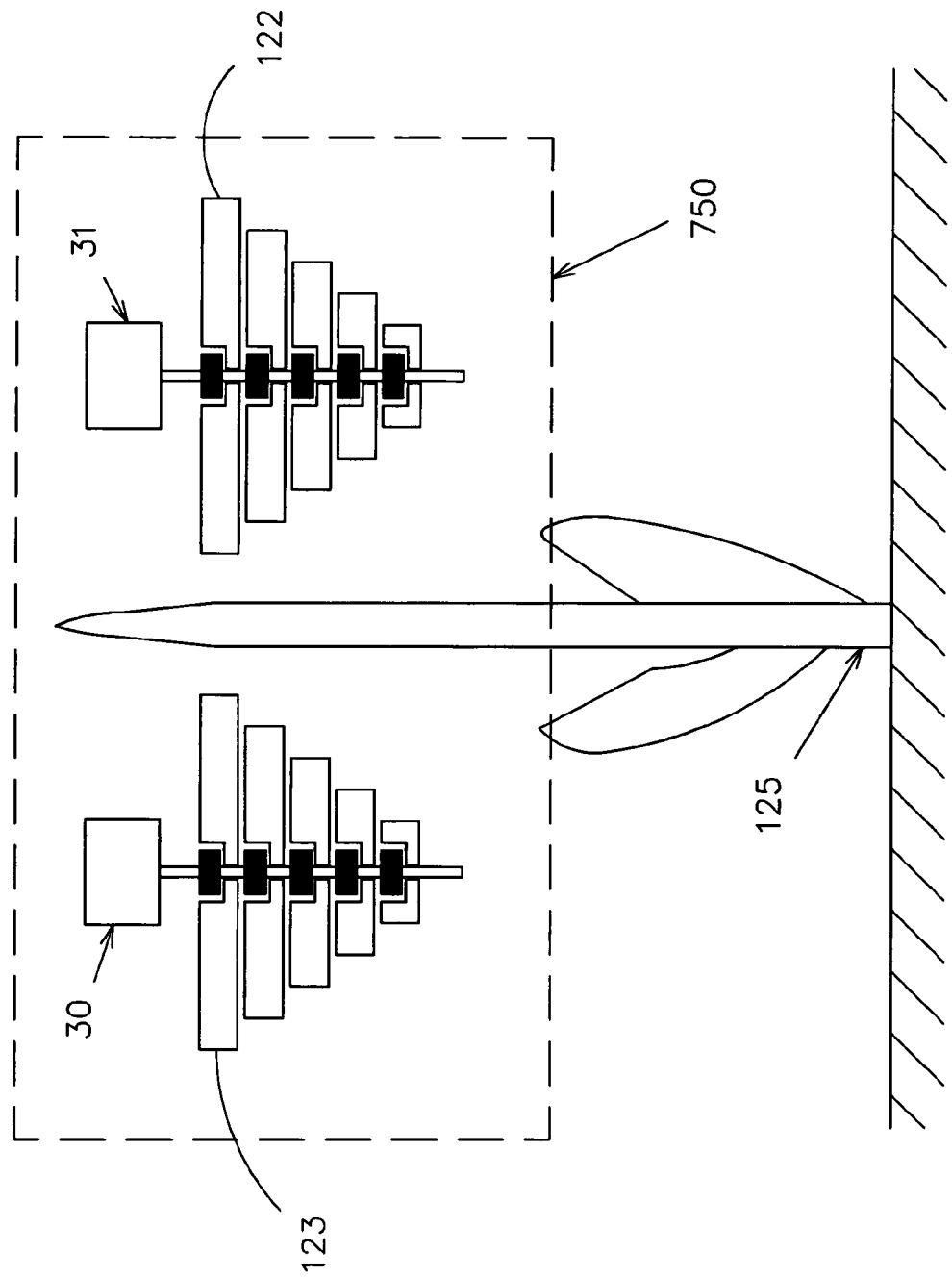
FIG. 13 is a front pictorial view of an embodiment detecting a row of vegetation such as corn.

FIG. 13 show another application of the paddle sensor. Two vertically mounted paddle sensors 122 and 123 are mounted such that each paddle sensor is on one side of a crop 125 such as corn. The combination sensor 750 would determine where the crop 125 is relative to these two sensors 122 and 123. The combination sensor 750 would provide output so that a vehicle such as a tractor with a crop attachment to follow the row of crops via an automated steering system.

Figure 14:
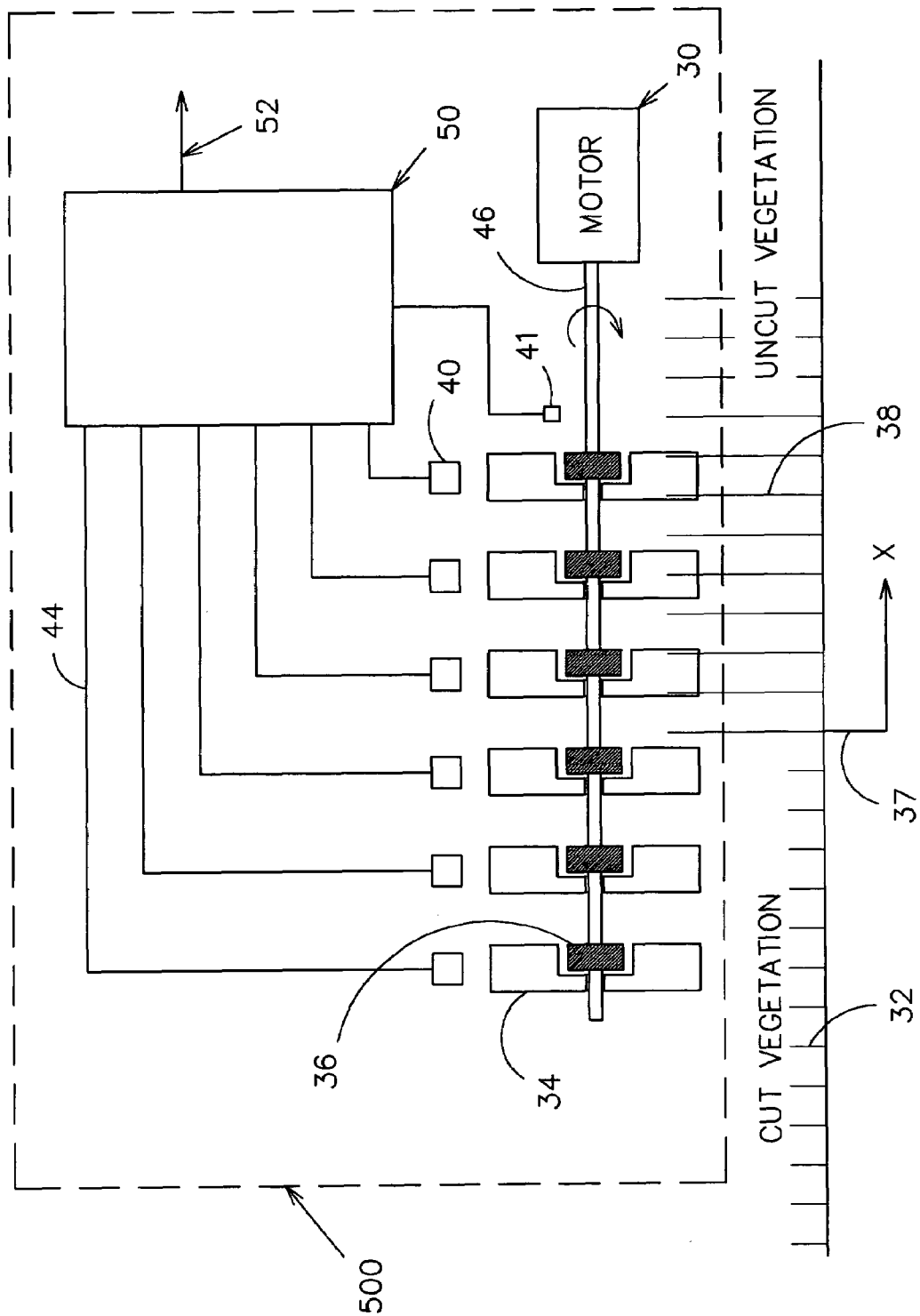
FIG. 14 is a front pictorial view of an embodiment detecting the boundary between mowed and unmowed vegetation.

FIG. 14 shows a block diagram of another embodiment 500 of the invention. A motor 30 drives a shaft 46 which is physically connected to the hubs 36. The hubs 36 are magnetically, mechanically, fluidly, or similarly coupled to the paddles 34. The sensors 40 detect the motion of the rotating paddles 34. A reference sensor 41 detects the motion of the shaft 46. The module 50, via lines 44, compares the motion detected by the sensors 40 to the motion detected by the reference sensor 41 and determines which paddle is moving at a similar velocity as the shaft 46. The output 52 of the module 50 is the detected boundary 37 and the number of paddles 34 that are moving and not moving relative to the shaft 46. The vegetation 38 that is not mowed will prevent the paddles 34 from moving as fast as the shaft 46. The paddles 34 that are in area of the mowed vegetation 32 will move similarly to the shaft 46.

Figure 15:
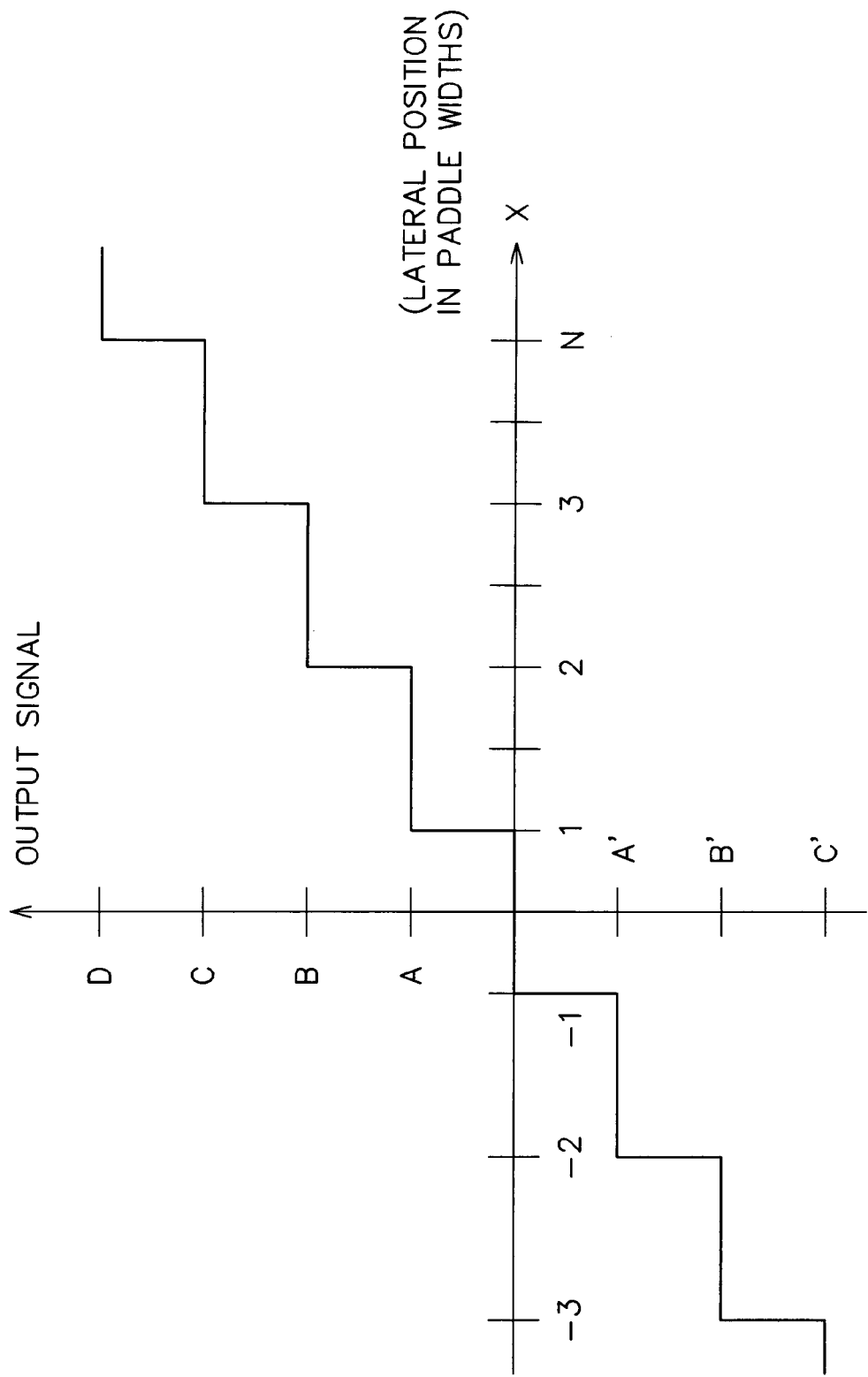
FIG. 15 is a graphical plot of the output of the embodiment in FIG. 14 respect to the number of paddles that are in the mowed and unmowed vegetation.

FIG. 15 show the output 52 where the overall paddle sensor 500 detects the boundary between the mowed vegetation 32 and the unmowed vegetation 38 in FIG. 14. The output signal 52 depends on the number of paddles 34 that are in the unmowed vegetation 38, compared to the number of paddles 34 that are not. As an example, if a total of six paddles are used and four are in the mowed vegetation 32, then the output is would indicate one step to the left, i.e. level 'A' in FIG. 15. If equal number of paddles 34 are detected in the mowed 32 and unmowed vegetation 38, then the output signal would be even or zero in this case. The output signal 52 indicates the position of the paddles 34 relative to the boundary 37. The signal 52 depends on the total number of paddles 44, the width of the paddles 34, and the number of paddles in the substance, in this illustration, vegetation.

Figure 16:
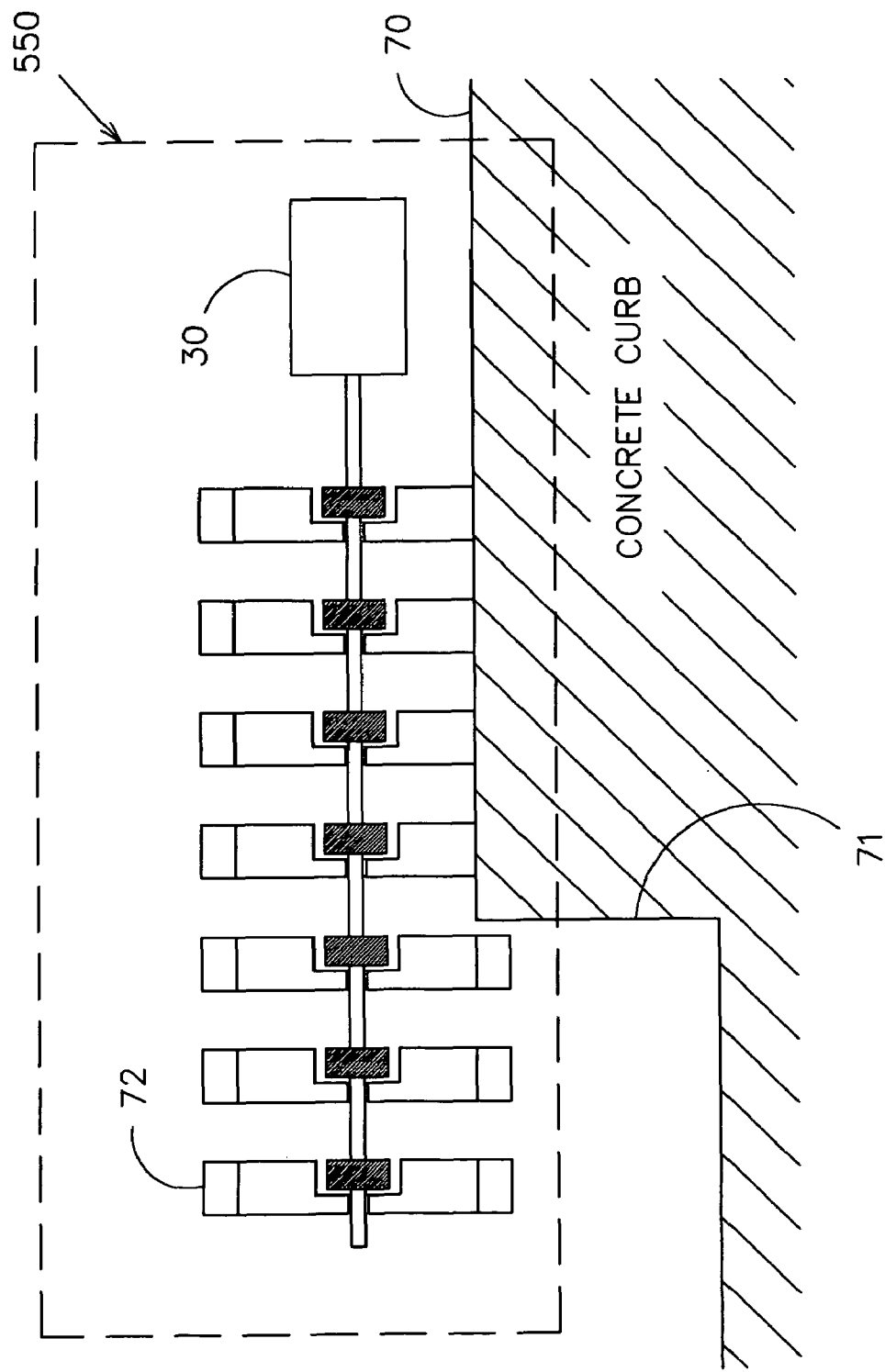
FIG. 16 is a front pictorial view of an embodiment detecting the edge of a concrete curb.

FIG. 16 shows another paddle sensor 550 which is similar to paddle sensor 500 except for having flexible paddles 72. The paddle sensor 550 detects the edge 71 of the curb on a sidewalk 70 or roadway. In this embodiment, the paddle sensor 550 determines how many flexible paddles 72 are on the curb. The number of flexible paddles 72 that are on the curb 70 determines the position of the paddle sensor 550 relative to the edge 71 of the curb 70.

Figure 17:
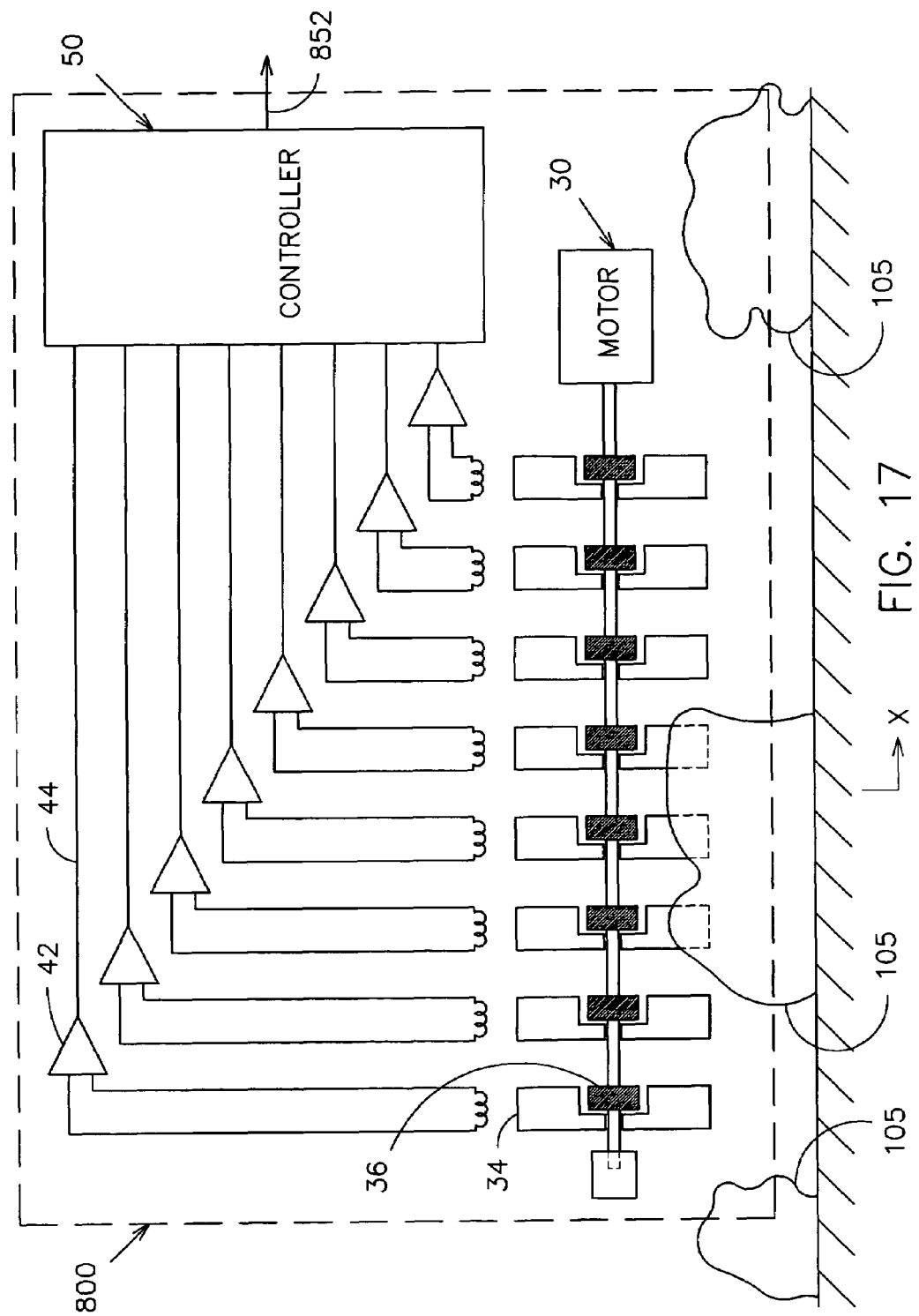
FIG. 17 is a front pictorial view of an embodiment detecting the row of vegetation such as strawberries.

FIG. 17 shows another embodiment where the paddle sensor 800 is used to detect the center of foliage 105, such as a strawberry row. Here, the paddle sensor 800 is centered over the foliage 105 and gives an indication of which paddles are moving on the two sides. Output 852 from the paddle sensor 800 indicates the center of the foliage 105 and the deviation from the center.

Figure 18:
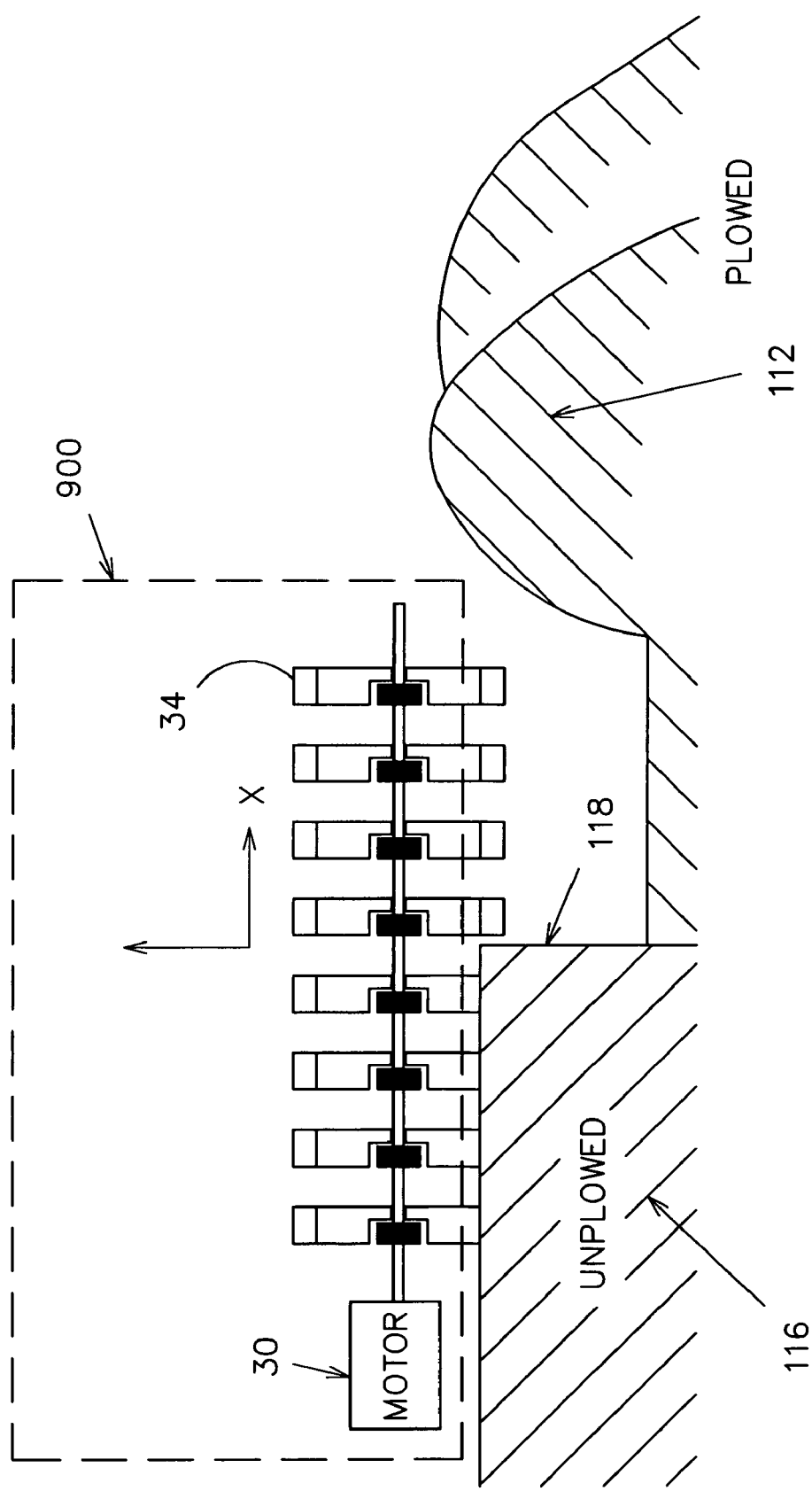
FIG. 18 is a front pictorial view of an embodiment detecting the boundary between plowed and unplowed field.

FIG. 18 shows a paddle sensor 900 that's detects the boundary 118 between a plowed area 112 and unplowed area 116 of a field. The paddle sensor 900 may be used to steer a tractor along a furrow via an automated steering system.

FIGS. 19A and 19B shows top and side views of the paddle sensor 150 moving over a gap 156 in the two surfaces 154 and 152 (such as cut and uncut grass) where there is no boundary to be detected. To overcome this concern, the paddle sensor 150 is programmed to output the boundary position based on previous process data until the boundary is again detected.

FIG. 20 shows combining the output 186 from a vision sensor 180 with the output 52 of the paddle sensor 150, via a Kalman filter 188, to provide an output 190 when the paddle sensor is over the gap 156. The vision sensor 188 looks beyond the gap to provide this determination.

Figure 21:
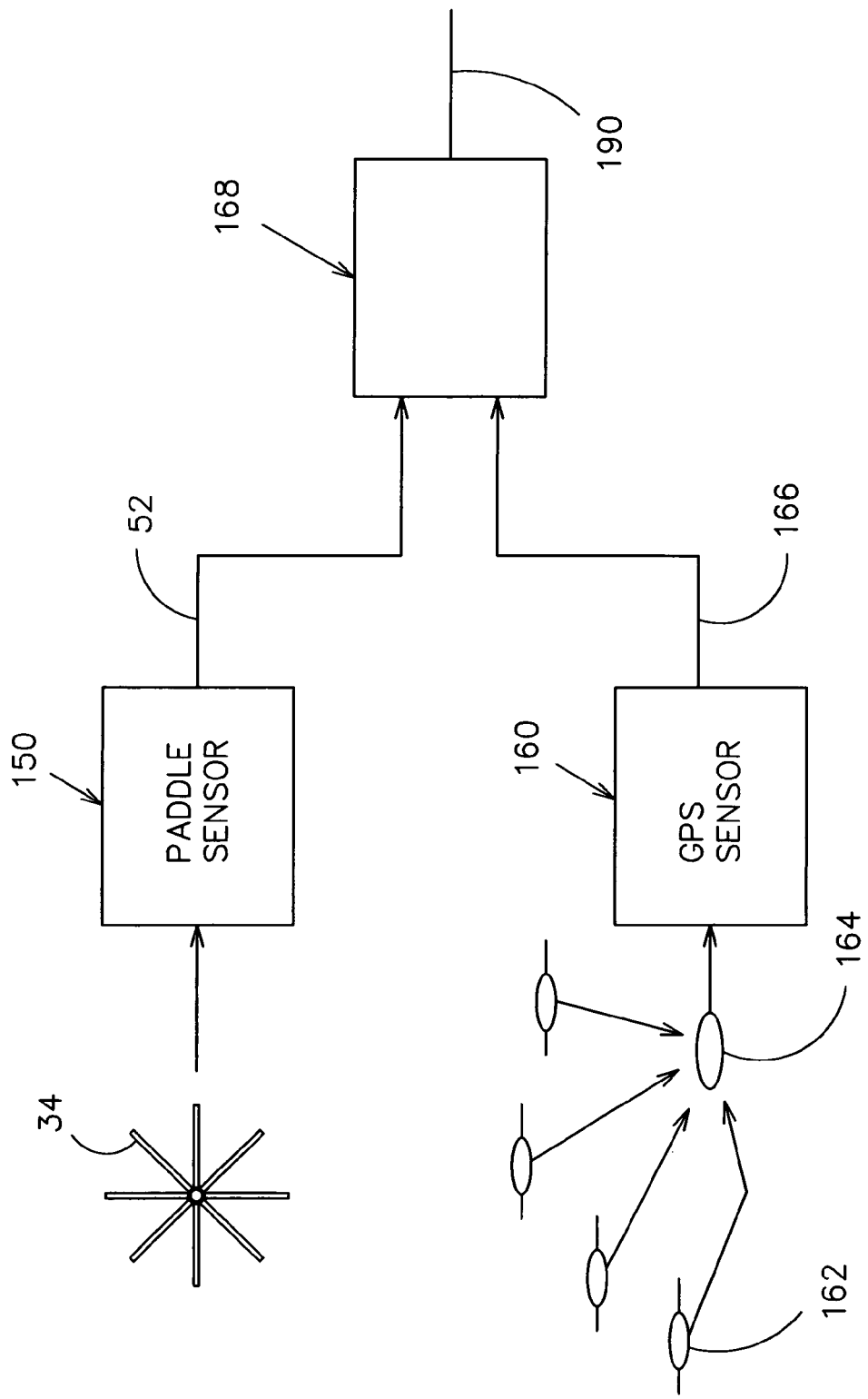
FIG. 21 is a block diagram of the embodiment integrated with a GPS sensor.

The paddle sensor 150 can also be combined with other sensors to overcome the gap 156 in the boundary area. FIG. 21 shows such arrangement. In this embodiment, the output 52 of the paddle sensor 150 is combined with the output 166 of a GPS sensor 160, using a Kalman filter circuit 168 to provide an output 190 of the boundary 158 even if the gap 156 is present, as shown in FIGS. 19A and 19B. The GPS sensor 160 receives signals from the satellites 162 via the GPS antenna 164 and processes these signals to provide an indication of the GPS sensor location.

Figure 22:
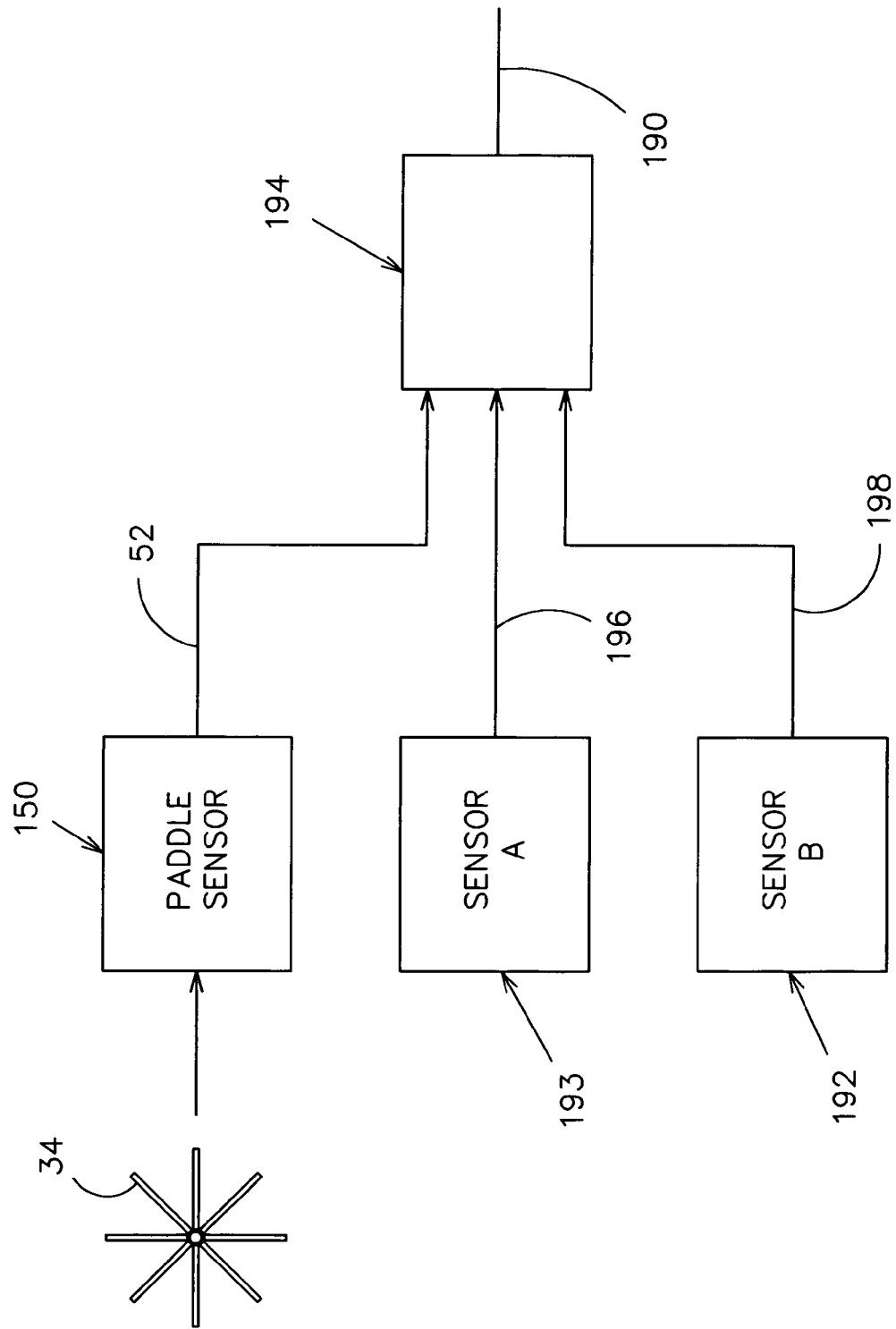
FIG. 22 is a block diagram of the embodiment integrated with other sensors.

FIG. 22 shows that the outputs 196 and 198 from other sensors such as sensor A 193 or sensor B 192 that can be combined with the output 52 of the paddle sensor 150 to provide an indication of the boundary 158. Sensors A and B can each be for example vision sensor, GPS sensor, DGPS sensor, compass sensor, navigation sensor, gyro sensor, magnetic sensor, or mechanical sensor.

Figure 23:
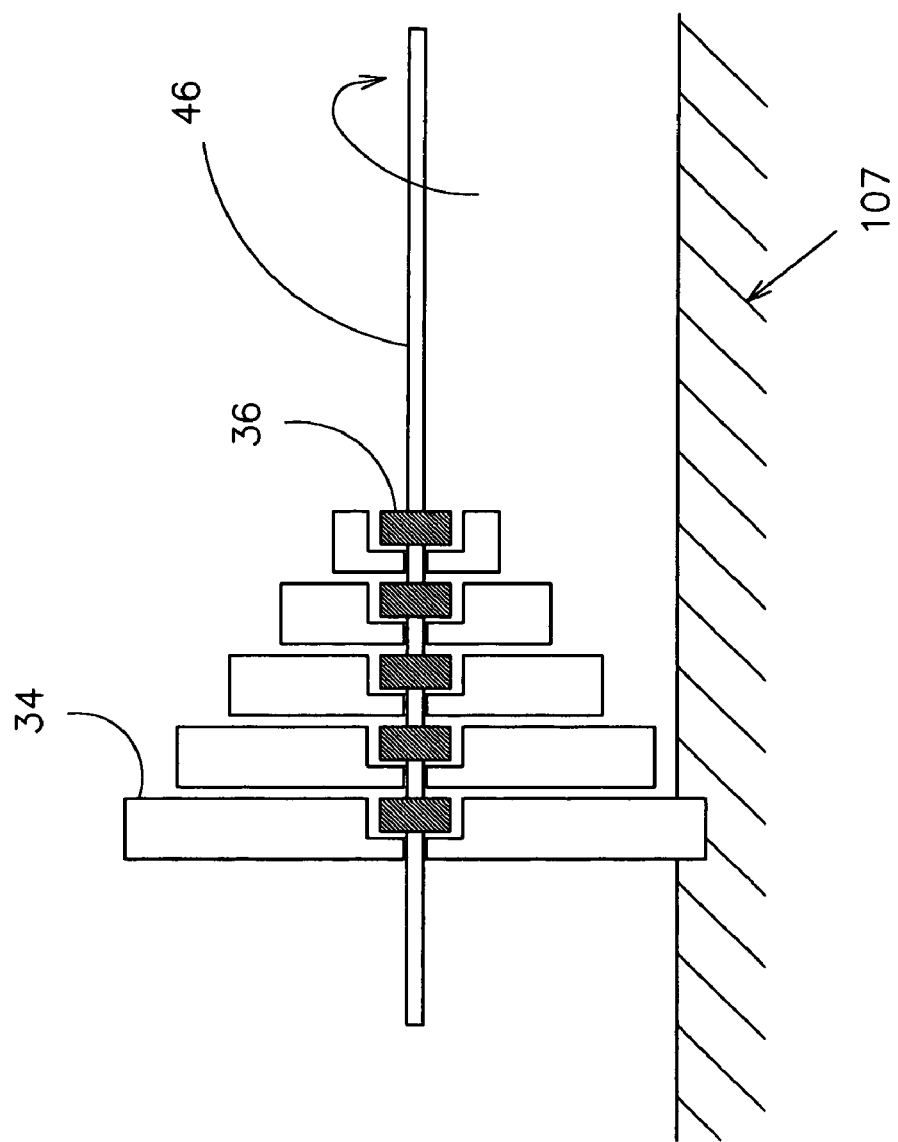
FIG. 23 is a partial front pictorial view of an embodiment detecting the height from the ground or horizontal surface.

Orienting the vertical paddle sensor of FIG. 23 horizontal to the ground, forms another embodiment of the invention. FIG. 23 shows a height sensor where the paddles 34 are aligned perpendicular to the ground 107 with various lengths of paddles, and the rotating shaft 46 is aligned parallel to the ground 107. In a manner similar to the previously described embodiments, sensors can detect the paddles that are not moving and therefore provide an indication of the distance that the rotating shaft 46 is close to the ground 107.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description.

What is claimed and desired to be secured by Letters Patent of the United States is:

1. An apparatus for detecting a substance, said apparatus comprising:
    a) a rotating shaft;
    b) a rotatable member;
    c) a slip clutch coupling said shaft to said rotatable member in rotating engagement; and
    d) electronic sensor means for detecting impeded rotation of said rotatable member relative to said shaft due to slippage of said clutch in response to said rotatable member contacting said substance without stoppage of said shaft.

2. The apparatus of claim 1, wherein said rotatable member is a rigid paddle.

3. The apparatus of claim 1, wherein said rotatable member is a flexible paddle.

4. The apparatus of claim 1, wherein said slip clutch is an electromagnetic, a magnetic, a pneumatic, a hydraulic, or a friction slip clutch mechanism.

5. The apparatus of claim 1, wherein said sensor means for detecting impeded rotation is an optical, magnetic, capacitive, or inductive sensor.

6. The apparatus of claim 1, further comprising:
    a drive motor which rotates the shaft.

7. The apparatus of claim 1, wherein said slip clutch is an electromagnetic slip clutch, and said sensor means comprises an electromagnetic coil of said slip clutch.

8. The apparatus of claim 1, wherein said sensor means outputs the level of the substance in a container, or the distance from a reference point on the apparatus to a surface of the substance.

9. The apparatus of claim 1, wherein said sensor means comprises an integrated circuit or a microcontroller.

10. The apparatus of claim 1, wherein said substance is vegetation, plowed furrow, sidewalk, wall, flowable material, or ground.

11. An apparatus for detecting a boundary between a first, relatively higher surface, and a second, relatively lower surface, said apparatus comprising:
    a) a rotating shaft;
    b) a plurality of rotatable members mounted on said shaft;
    c) a plurality of slip clutches, each said slip clutch coupling said shaft to one of said rotatable members in rotating engagement; and
    d) sensor means for detecting impeded rotation of said rotatable members due to slippage of said clutches in response to contacting said first, relative higher surface, but not contacting said second, relative lower surface.

12. The apparatus of claim 11, wherein said sensor means is integrated with GPS, DGPS, vision, compass, or other sensors to indicate the boundary when a gap in the surfaces is present.

13. An apparatus for measuring a distance from a reference point on the apparatus to a surface of a material, said apparatus comprising:
    a) a rotating shaft;
    b) a plurality of rotatable members mounted on said shaft;
    c) a plurality of slip clutches, each said slip clutch coupling said shaft to one of said rotatable members in rotating engagement; and
    d) sensor means for deriving the distance by detecting impeded rotation of said rotatable members due to slippage of said clutches in response to contact with said material.

14. An apparatus for measuring the level of a flowable material in a container, said apparatus comprising:
    a) a rotating shaft;
    b) a plurality of rotatable members mounted on said shaft;
    c) a plurality of slip clutches, each said slip clutch coupling said shaft to one of said rotatable members in rotating engagement; and
    d) sensor means for deriving the level by detecting impeded rotation of said rotatable members due to slippage of said clutches in response to contact with the material.

15. The apparatus of claim 13, wherein said material is floor material, wall material, curb material, ground material, road material, or surface material.

* * * * *